(12) United States Patent
Kato et al.

(10) Patent No.: US 10,741,049 B2
(45) Date of Patent: Aug. 11, 2020

(54) ELEVATOR MOTION ALERT SYSTEM

(71) Applicant: Otis Elevator Company, Farmington, CT (US)

(72) Inventors: Mitsuru Kato, Inzai (JP); Hideki Miyazawa, Sakura (JP); Jiro Murata, Shibayama (JP)

(73) Assignee: OTIS ELEVATOR COMPANY, Farmington, CT (US)

( * ) Notice: Subject to any disclaimer, the term of this patent is extended or adjusted under 35 U.S.C. 154(b) by 381 days.

(21) Appl. No.: 15/715,540

(22) Filed: Sep. 26, 2017

(65) Prior Publication Data

US 2019/0096222 A1   Mar. 28, 2019

(51) Int. Cl.
| | |
|---|---|
| *G08B 21/18* | (2006.01) |
| *B66B 5/00* | (2006.01) |
| *H04W 4/80* | (2018.01) |
| *B66B 3/00* | (2006.01) |

(52) U.S. Cl.
CPC ............. *G08B 21/18* (2013.01); *B66B 3/002* (2013.01); *B66B 5/005* (2013.01); *B66B 5/0025* (2013.01); *B66B 5/0087* (2013.01); *H04W 4/80* (2018.02)

(58) Field of Classification Search
CPC ......... G08B 21/18; H04W 4/80; B66B 3/002; B66B 5/0025; B66B 5/0087; B66B 5/005
USPC ........................................................ 187/397
See application file for complete search history.

(56) References Cited

U.S. PATENT DOCUMENTS

| | | | |
|---|---|---|---|
| 6,202,797 B1 | 3/2001 | Skolnick et al. | |
| 6,550,585 B2 | 4/2003 | Schoppa et al. | |
| 7,148,791 B2 | 12/2006 | Grisham et al. | |
| 7,441,631 B2 | 10/2008 | Oh et al. | |
| 8,556,043 B2 | 10/2013 | Mangini et al. | |
| 8,893,858 B2 | 11/2014 | Shi et al. | |
| 9,327,953 B2 | 5/2016 | Sayles | |
| 9,359,171 B1 | 6/2016 | Nowel | |
| 2010/0289662 A1* | 11/2010 | Dasilva ................... F16P 3/147 340/686.6 |
| 2011/0315490 A1* | 12/2011 | Shi ........................ B66B 5/0025 187/393 |

(Continued)

FOREIGN PATENT DOCUMENTS

| | | |
|---|---|---|
| EP | 3064463 A1 | 9/2016 |
| JP | H09303684 A | 11/1997 |

(Continued)

OTHER PUBLICATIONS

Memco, "Surfguard Elevator Intrusion Detection Device", Product Datasheet, Avire Ltd., available at: http://halmapr.com/memcowp/wp-content/uploads/2013/04/Surfguard-Datasheet-V01-GB1.pdf, accessed Sep. 26, 2017, 3pgs.

(Continued)

*Primary Examiner* — Jeffrey Donels (74) *Attorney, Agent, or Firm* — Cantor Colburn LLP (57) ABSTRACT

An elevator motion alert system for alerting a mechanic working inside a hoistway comprises a self-power-generating car beacon mounted on an elevator car, a self-power-generating counterweight beacon mounted on a counterweight, and a mobile device carried by the mechanic for receiving signals transmitted from the car beacon and the counterweight beacon and for providing an alert to the mechanic whenever the elevator car or the counterweight is approaching.

14 Claims, 7 Drawing Sheets

(56) References Cited

U.S. PATENT DOCUMENTS

| | | | | |
|---|---|---|---|---|
| 2012/0018256 A1* | 1/2012 | Mangini | ............... | B66B 5/0043 |
| | | | | 187/247 |
| 2012/0268261 A1* | 10/2012 | Frederick | ................. | F16P 3/14 |
| | | | | 340/435 |
| 2014/0238782 A1* | 8/2014 | Ishiguro | ................. | B66B 1/302 |
| | | | | 187/290 |
| 2017/0137256 A1* | 5/2017 | Meguro | ................. | B66B 5/005 |
| 2019/0084796 A1* | 3/2019 | Buckley | ................. | B66B 5/005 |

FOREIGN PATENT DOCUMENTS

| | | | |
|---|---|---|---|
| JP | 2015034076 A | 2/2015 | |
| JP | 2016055956 A | 4/2016 | |
| JP | 2016055973 A | 4/2016 | |
| WO | 2008082380 A1 | 7/2008 | |
| WO | 2014095511 A1 | 6/2014 | |

OTHER PUBLICATIONS

European Search Report for application EP 18196646.6, dated Feb. 22, 2019, 14 pages.

Glynne-Jones, P. et al., "An electromagnetic, vibration-powered generator for intelligent sensor systems", Sensors and Actuators, vol. 110, No. 1-3, Feb. 2004, 6 pages.

* cited by examiner

the mechanic.

ELEVATOR MOTION ALERT SYSTEM

BACKGROUND

This invention generally relates to an elevator system. More particularly, this invention relates to an elevator motion alert system for alerting a mechanic working inside an elevator hoistway.

Maintenance and repair of elevator systems may require a mechanic to enter the elevator hoistway. The mechanic may need to work within the pit at the bottom of a hoistway, on top of the elevator car or at an intermediate location within the hoistway between the pit and the overhead. Mechanics may be faced with dangerous situations caused by a moving elevator car and a moving counterweight.

For example, a mechanic working on top of the elevator car must avoid collision with a passing counterweight. When working in the pit, the mechanic must avoid collision with either a car or a counterweight moving downward into the pit. When working in an intermediate location between the pit and the overhead, the mechanic must avoid collision with either a car or a counterweight passing by.

WO 2008/082380 discloses a warning system for mechanics working inside an elevator hoistway which senses elevator cab position within the hoistway and senses the presence of the mechanic. A mechanic will receive a voice-based warning message of approaching danger based upon the sensed elevator and mechanic positions. US 2017/137256 A1 discloses an elevator motion alert system configured to alert mechanics working inside an elevator hoistway which detects motion of an elevator car or counterweight and broadcasts a pressure wave indicative of elevator car or counterweight motion. An electronic device receives the pressure wave and alerts the mechanic.

In these prior art systems, various devices for sensing and communicating the position or motion of the elevator car, counterweight and/or mechanic are necessary and power supplies and wiring for signal communication are required. Installation of such devices in existing elevator systems would require additional costs and time since rewiring would be necessary. Further, the location of such devices would be limited.

In view of the above and other considerations, there is a need for providing an elevator motion alert system for alerting a mechanic working in an elevator hoistway which is easy to install in existing elevators.

BRIEF SUMMARY

According to one embodiment of the invention, an elevator motion alert system for alerting a mechanic working inside a hoistway comprises a self-power-generating car beacon mounted on an elevator car, a self-power-generating counterweight beacon mounted on a counterweight, and a mobile device carried by the mechanic for receiving signals transmitted from the car beacon and the counterweight beacon and for providing an alert to the mechanic whenever the elevator car or the counterweight is approaching.

According to another embodiment of the invention, a method for alerting a mechanic working inside a hoistway comprises mounting a self-power-generating car beacon on an elevator car and a self-power-generating counterweight beacon on a counterweight, receiving a signal transmitted from the car beacon and/or the counterweight beacon and providing an alert to the mechanic whenever the received signal indicates that the elevator car or the counterweight is approaching.

BRIEF DESCRIPTION OF THE DRAWINGS

The detailed description explains embodiments of the invention, together with advantages and features, by way of example with reference to the drawings.

DETAILED DESCRIPTION

Figure 1A:
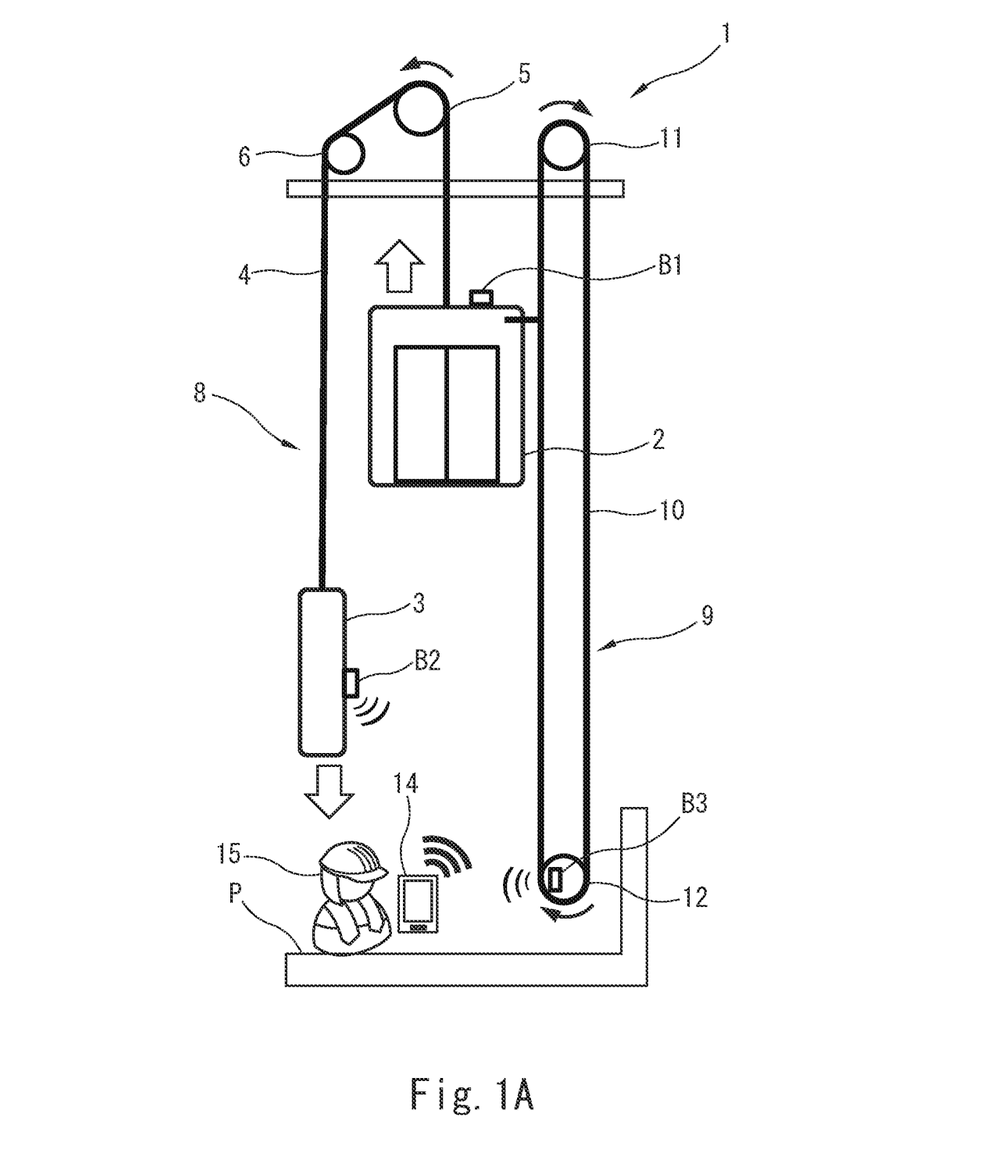
FIGS. 1A to 1C are schematic views of an elevator system including the elevator motion alert system of the present invention with the mechanic in the pit of the hoistway.

FIG. 1A schematically shows selected portions of an example elevator system 1. An elevator car 2 is connected to a counterweight (CTW) 3 by a plurality of hoisting ropes 4. The ropes 4 extend over a traction sheave 5, which is driven by a machine (not shown), and a deflector sheave 6. Traction between the traction sheave 5 and the ropes 4 drives the car 2 and the counterweight 3 vertically through a hoistway 8.

A governor device 9 prevents the elevator car 2 from exceeding a maximum speed. The example governor device 9 includes a governor rope 10 that travels with the elevator car 2. A governor sheave 11 and a tension sheave 12 are located at opposite ends of a loop formed by the governor rope 10. The configuration of the elevator system components may vary from this example in various aspects. In other words, the invention is not necessarily limited to the example elevator system configuration or the specific components of the illustration.

An elevator motion alert system of the present invention comprises a first beacon B1 on top of the elevator car 2, a second beacon B2 on the counterweight 3, a third beacon B3 on the tension sheave 12 of the governor device 9 and a mobile device 14 held by the mechanic 15. The mobile device 14 is a smart phone in this embodiment, but may be any kind of device carried or worn by the mechanic including but not limited to a cell phone, tablet, lap top computer or a wearable device such as a smart watch or smart glasses. The mobile device may also be a dedicated device provided as a headphone, earphone, badge, belt, helmet or cap or in clothing such as a vest or uniform.

The beacons B may be Bluetooth® low energy beacons which use Bluetooth low energy (BLE) proximity communication technology to periodically transmit signals including ID information via radio waves. Each beacon B may be identified by a unique ID. The coarse distance between each of the beacons B and the smart phone 14 may be determined by a distance-dependent intensity level of the radio waves received by the smart phone 14. The distance-dependent intensity level may be the Received Signal Strength Indication (RSSI).

Further, the approaching or departing of the beacons B with respect to the smart phone 14 may be determined by the change in the distance-dependent intensity level of the radio waves. When the intensity level is increasing, the beacon B will be moving toward the smart phone 14. When the intensity level is decreasing, the beacon B will be moving away from the smart phone 14.

The beacons B respectively have power generating functions which convert vibrational energy into electric power. The beacons B generate power and transmit signals whenever vibrational energy is provided to the beacons B, that is, whenever the object on which the beacon B is mounted moves. Since the beacons B are compact and lightweight, they may easily be attached to the car 2, counterweight 3 or tension sheave 12 such as by magnets or double-sided tapes.

The smart phone 14 has an application program for receiving signals from the beacons B and determining the distance-dependent intensity level of the received radio waves. Upon receiving a signal from the one or a plurality of the beacons B, the application will identify each beacon B by the ID information included in the signal and determine the approaching or departing of the beacon B based on change in the distance-dependent intensity level of the radio waves as described above. The application will provide an alarm and/or a message in response to the signals from the beacons B as will be described in more detail below.

Figure 2:
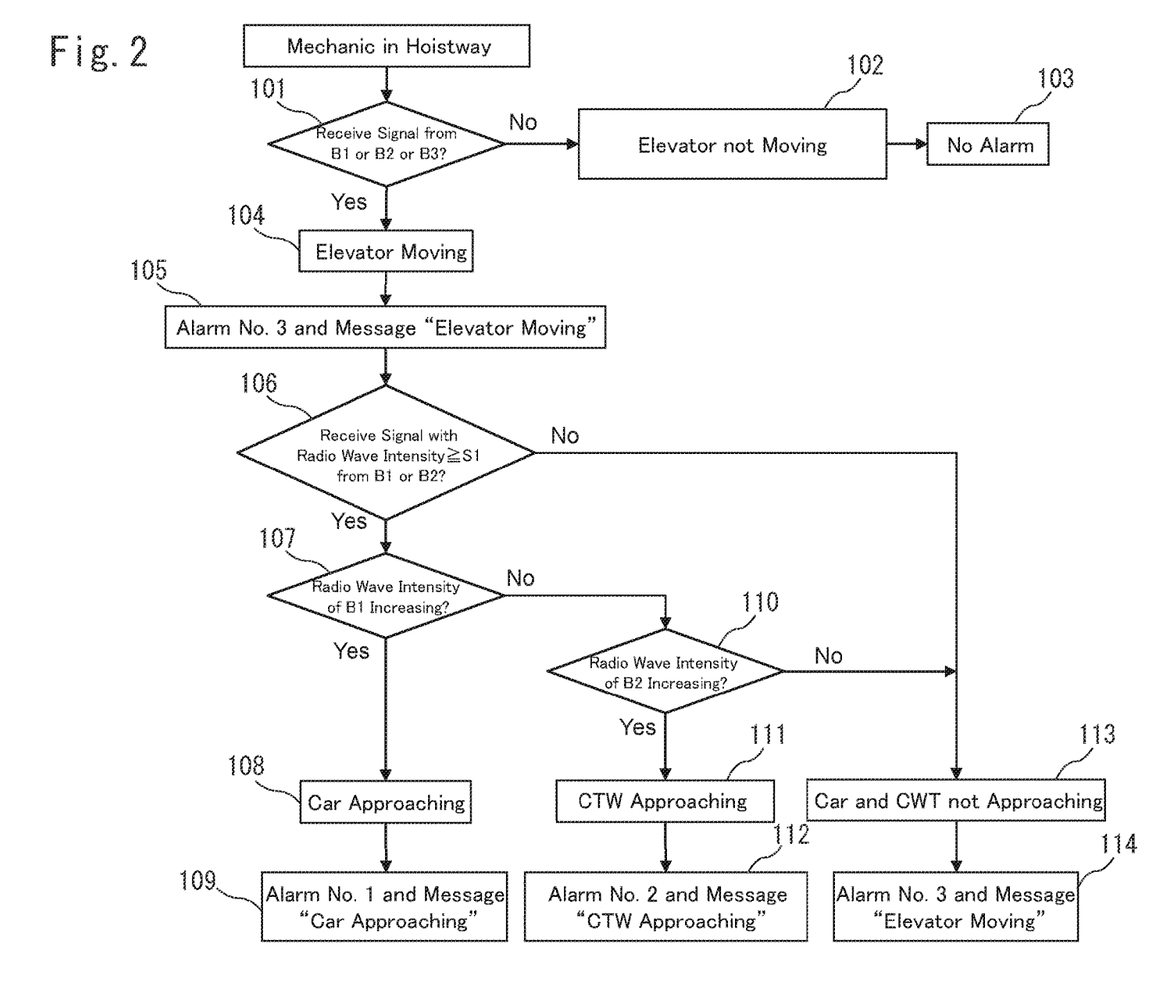
FIG. 2 is a flowchart showing a sequence performed by an application of a smart phone of the elevator motion alert system of FIG. 1.

FIG. 2 is a flowchart showing the sequence performed by the application program of the smart phone 14. When the mechanic 15 is in the hoistway 8, the application checks if signals are received from any one of beacons B1, B2, B3 (step 101). If no signals are received, it indicates that the elevator system 1 is not moving (step 102) and no alarm is given to the mechanic 15 (step 103).

If a signal is received from any one of beacons B1, B2, B3 in step 101, it indicates that the elevator system 1 is moving (step 104). The application provides an audible alarm No. 3 and a voice message "the elevator is moving" (step 105) to the mechanic. Next, it is checked if the radio wave intensity of signals received from beacons B1 or B2 are larger than a set level S1 (step 106). If so, it is checked if the radio wave intensity of beacon B1 is increasing (step 107). If the radio intensity of beacon B1 is increasing, it indicates that the elevator car 2 is approaching (step 108) and the application provides an alarm No. 1 and a voice message "the car is approaching" to the mechanic (step 109).

If the radio wave intensity of beacon B1 is not increasing in step 107, it is checked if the radio wave intensity of beacon B2 is increasing (step 110). If the radio wave intensity of beacon B2 is increasing, it indicates that the counterweight is approaching (step 111) and the application provides an audible alarm No. 2 and a voice message "the counterweight is approaching" to the mechanic (step 112).

If the radio wave intensity of signals received from beacons B1 or B2 are not larger than a set level S1 in step 106 or if the radio wave intensity of beacon B2 is not increasing in step 110, it indicates that the car and counterweight are not approaching (step 113) and the audible alarm No. 3 and the voice message "the elevator is moving" is continued (step 114).

Figure 1B:
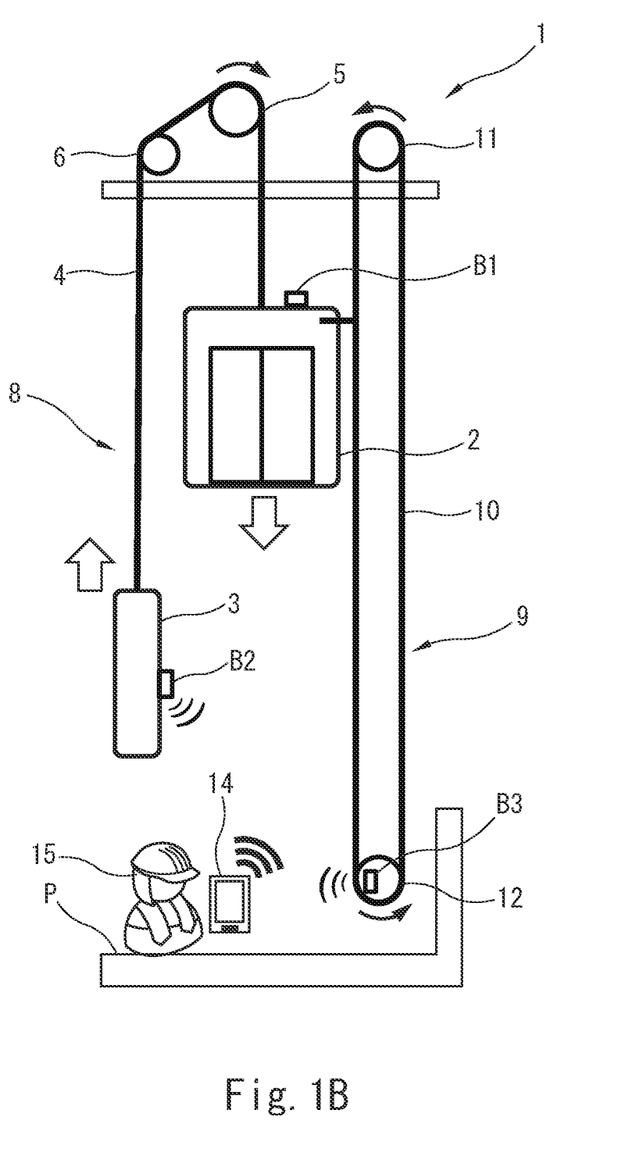
Figure 1C:
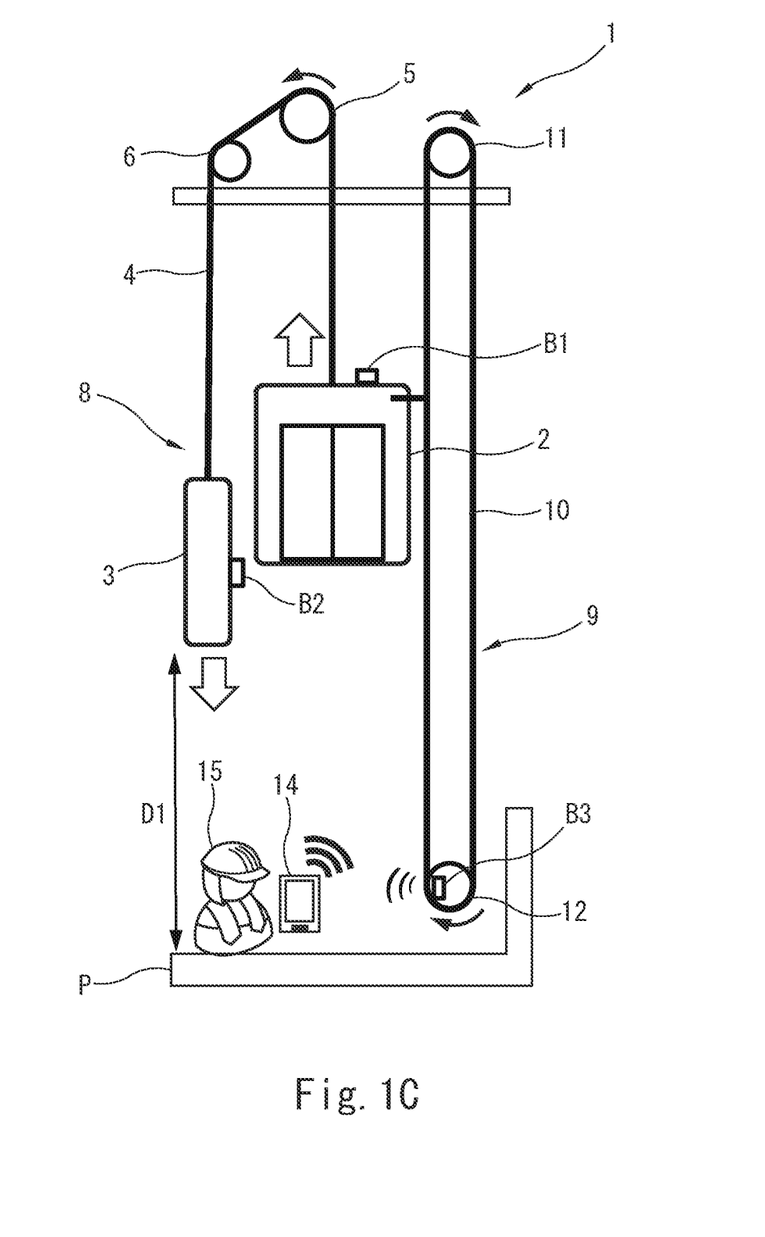

FIGS. 1A to 1C show how the elevator motion alert system works when the mechanic is in the pit P at the bottom of the hoistway 8. In FIG. 1A, the elevator car 2 is moving upwards away from the mechanic 15 and the counterweight 3 is in the proximity of the mechanic 15 and is moving downwards towards the mechanic 15. The smart phone 14 receives signals from beacons B2 and B3, detects that the radio wave intensity of beacon B2 is larger than the set level S1 and that the radio wave intensity of beacon B2 is increasing. In this case, the smart phone 14 provides an audible alarm No. 2 and a voice message "the counterweight is approaching" to the mechanic 15. The mechanic 15 may step forward to avoid collision with the counterweight 3.

In FIG. 1B, the elevator car 2 is moving downwards towards the mechanic 15 and the counterweight 3 is in the proximity of the mechanic 15 but is moving upwards away from the mechanic 15. The smart phone 14 receives signals from beacon B2 and B3, detects that the radio wave intensity of beacon B2 is larger than the set level S1 but does not detect an increasing radio wave intensity of beacon B2. In this case, the smart phone 14 provides an audible alarm No. 3 and a voice message "the elevator is moving" to the mechanic 15. This will enable the mechanic to be aware of elevator movement and to watch out not to touch moving components in the pit.

In FIG. 1C, the elevator car 2 is moving upwards and the counterweight 3 is moving downwards, but the elevator car 2 and the counterweight 3 are both a safety distance D1 away from the mechanic 15. In this case, only the signal of beacon B3 is received or the signal of beacon B3 and the signal of beacon B1 and/or B2 having a radio wave intensity lower than the set level S1 is received. Therefore, the smart phone 14 provides an audible alarm No. 3 and a voice message "the elevator is moving" to the mechanic 15. This will enable the mechanic to be aware of elevator movement and to watch out not to touch moving components in the pit.

The "safety distance D1" is a distance which is not immediately hazardous to the mechanic 15 regardless of the direction of movement of the elevator car 2 or counterweight 3.

Figure 3A:
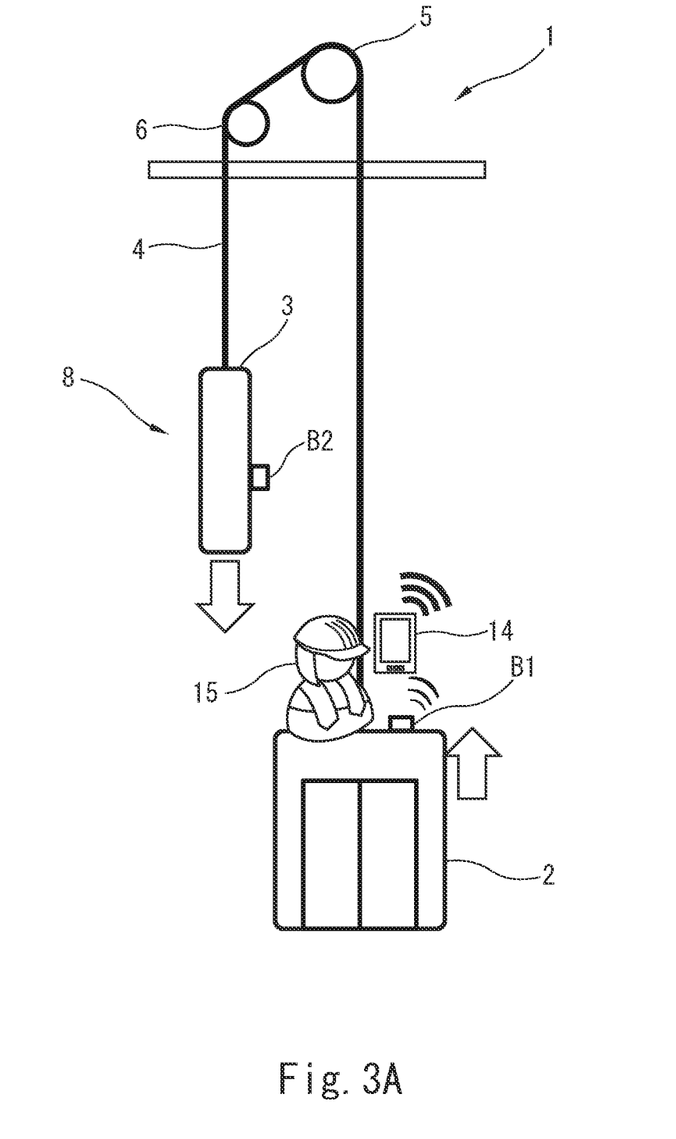
FIGS. 3A to 3C are schematic views similar to FIGS. 1A to 1C with the mechanic on top of the elevator car.
Figure 3B:
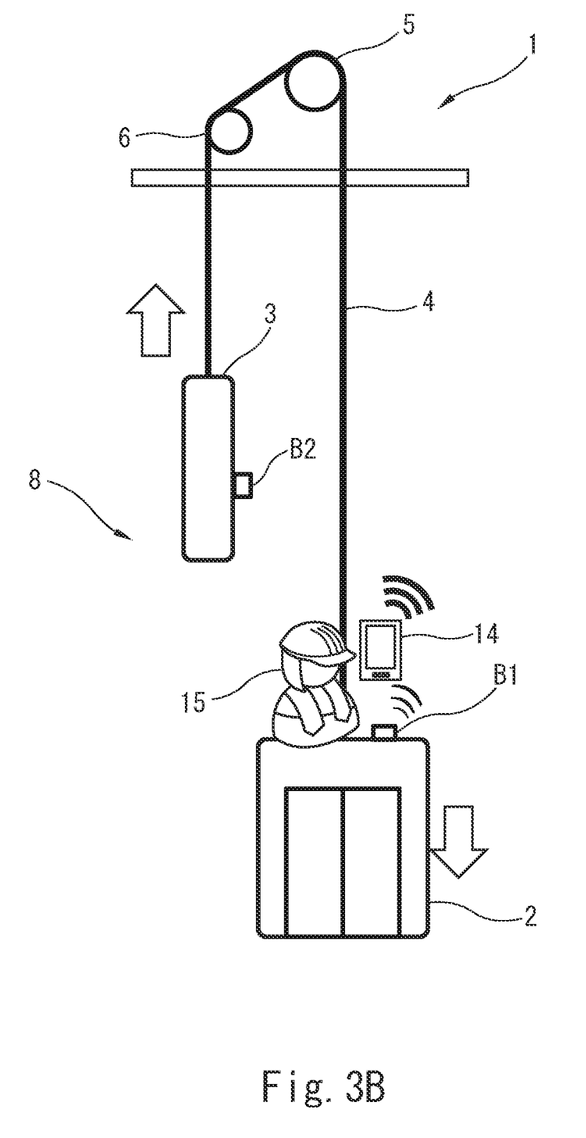
Figure 3C:
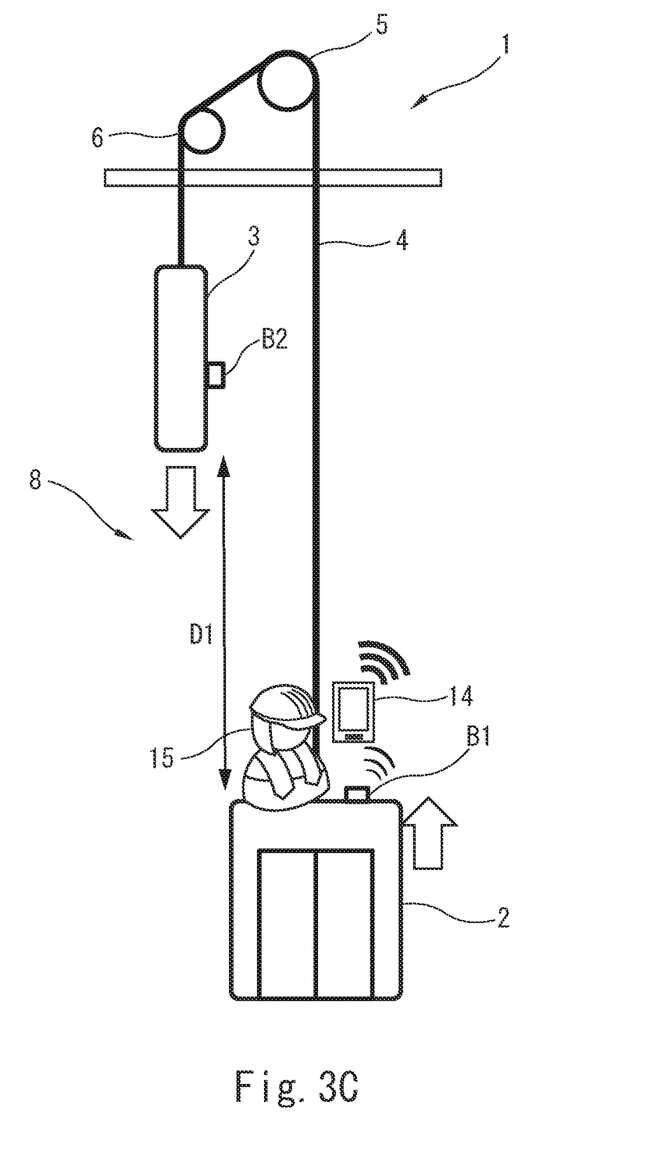

FIGS. 3A to 3C show how the elevator motion alert system works when the mechanic 15 is on top of the elevator car 2. The mechanic 15 may move the elevator system 1 in an inspection mode while he or she is on top of the elevator car 2. When the mechanic 15 is on top of the elevator car 2, the smart phone 14 will receive and detect signals from beacon B1 on the elevator car 2 but will ignore such signals since the radio wave intensity of the signals from beacon B1 will be constant.

In FIG. 3A, the elevator car 2 is moving upwards and the counterweight 3 is in the proximity of the mechanic 15 and is moving downwards towards the mechanic 15. The smart phone 14 receives signals from beacons B1 and B2, detects that the radio wave intensity of the beacons B1 and B2 are larger than the set level S1 and detects that the radio wave intensity of beacon B2 is increasing. In this case, the smart phone 14 provides an audible alarm No. 2 and a voice message "the counterweight is approaching" to the mechanic 15. The mechanic 15 may step back to avoid collision with the counterweight 3.

In FIG. 3B, the elevator car 2 is moving downwards and the counterweight 3 is in the proximity of the mechanic 15 but is moving upwards away from the mechanic 15. The smart phone 14 receives signals from beacons B1 and B2, detects that the radio wave intensity of beacons B1 and B2 are larger than the set level S1 but does not detect the increasing radio wave intensity of beacons B1 or B2. In this case, the smart phone 14 provides an audible alarm No. 3 and a voice message "the elevator is moving" to the mechanic 15.

In FIG. 3C, the elevator car 2 is moving upwards and the counterweight 3 is moving downwards, but the counterweight 3 is a safety distance D1 away from the mechanic. The smart phone 14 receives a signal from at least beacon B1, detects that the radio wave intensity of beacon B1 is larger than the set level S1, but does not detect that the radio wave intensity of B1 is increasing. Therefore, the smart phone 14 provides an audible alarm No. 3 and a voice message "the elevator is moving" to the mechanic 15.

Similar alerts will be provided in situations where the elevator car 2 moves as described above in relation to the counterweight 3 and the counterweight 3 moves as described above in relation to the elevator car 2.

Although beacon B3 is mounted on the tension sheave 12 in this embodiment, beacon B3 may be mounted on a compensation sheave (not shown) in the pit P. Further to alerting the mechanic 15 of elevator movement, the signal from beacon B3 may be used to determine if the mechanic 15 with the smart phone 14 is in the pit P. Beacons B may also be mounted alternatively or additionally to the drive sheave 5, governor sheave 11, car sheave (not shown) or any other rotational body to alert the mechanic 15 of elevator movement. Mounting beacon B3 on a sheave is particularly advantageous in high-rise buildings since the mechanic 15 will be alerted of elevator movement even when the elevator car and counterweight are located away from the mechanic 15.

The alarm Nos. 1 to 3 may be a beeping sound or a buzzing sound or any kind of sound which may alert the mechanic 15. A different sound and/or sound level may be used for each of the alarm Nos. 1 to 3. For example, the sound and/or sound level of alarm No. 3 may be different from alarm Nos. 1 and 2 such that the mechanic 15 may perceive that the elevator system 1 is moving but the elevator car 2 and counterweight 3 is still a safety distance D1 away. However, the same sound and/or sound level may be used for all alarms. In addition to or in place of an audible alarm, the mobile device may also provide a vibrational alarm to the mechanic. Such vibrational alarm would be particularly effective if the mobile device is a wearable device.

The elevator motion alert system of the present invention allows ready installation to existing elevators without the need of rewiring and may be easily mounted where required. Further, since the beacons are self-power-generating, it is not necessary to periodically exchange batteries which would require a mechanic to enter the hoistway each time batteries are to be exchanged.

Furthermore, since the elevator motion alert system of the present invention makes detections based on the distance-dependent intensity level of the radio waves, i.e., the estimated distance between the beacons B and the smart phone 14, it is possible to avoid collisions not only on top of the elevator car or in the pit but also at intermediate locations between the pit and the overhead.

Although the present invention has been described in relation to an elevator system with one elevator in one hoistway, the present invention can also be applied to a group elevator system with a plurality of elevators sharing one hoistway. In this case, the mechanic will have a risk of collision with the car or counterweight of adjacent elevators. The beacons of adjacent elevators may be distinguished from the beacons of the elevator the mechanic is working at by a unique ID. The mechanic may step away from an adjacent elevator in response to an alarm or message that a car or counterweight of an adjacent elevator is approaching.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An elevator motion alert system for alerting a mechanic working inside a hoistway, comprising:
    a self-power-generating car beacon mounted on an elevator car;
    a self-power-generating counterweight beacon mounted on a counterweight; and
    a mobile device carried by the mechanic for receiving signals transmitted from the car beacon and the counterweight beacon and for providing an alert to the mechanic whenever the elevator car or the counterweight is approaching;
    a self-power-generating sheave beacon mounted on a sheave;
    wherein the mobile device is configured to receive signals transmitted from the sheave beacon and provides an alert whenever the sheave is rotating.

2. The elevator motion alert system of claim 1, wherein the sheave beacon is mounted on a sheave positioned in the pit of the hoistway.

3. The elevator motion alert system of claim 1, wherein the beacons generate power and transmit signals whenever vibrational energy is provided to the beacons.

4. The elevator motion alert system of claim 1, wherein the beacons are Bluetooth low energy beacons.

5. The elevator motion alert system of claim 1, wherein the mobile device detects signals received from at least one of the car beacon and the counterweight beacon which have a radio wave intensity equal to or larger than a threshold S1.

6. The elevator motion alert system of claim 5, wherein the mobile device provides an alert to the mechanic when the radio wave intensity of the detected signals are increasing.

7. The elevator motion alert system of claim 1, wherein the mobile device is a smart phone, cell phone, tablet, lap top computer or a dedicated device.

8. The elevator motion alert system of claim 1, wherein the alert is at least one of an audible alert and a voice message.

9. A method for alerting a mechanic working inside a hoistway, comprising:
    mounting a self-power-generating car beacon on an elevator car and a self-power-generating counterweight beacon on a counterweight and a sheave beacon on a sheave;
    receiving a signal transmitted from at least one of the car beacon, the counterweight beacon and the sheave beacon; and
    providing an alert to the mechanic at least one of (i) whenever the received signal indicates that the elevator car or the counterweight is approaching and (ii) whenever a signal from the sheave beacon is received.

10. The method of claim 9, further comprising:
    detecting a signal received from at least one of the car beacon and the counterweight beacon which has a radio wave intensity equal to or larger than a threshold S1; and
    providing an alert to the mechanic when the radio wave intensity of the detected signal is increasing.

11. The method of claim 9, wherein the sheave beacon is mounted on a sheave positioned in the pit of the hoistway.

12. The method of claim 9, wherein the beacons generate power and transmit signals whenever vibrational energy is provided to the beacons.

13. The method of claim 9, wherein the beacons are Bluetooth low energy beacons.

14. The method of claim 9, wherein providing an alert to the mechanic comprises providing at least one of an audible alert and a voice message to the mechanic.

\* \* \* \* \*